United States Patent [19]
Wössner et al.

[11] 3,993,294
[45] Nov. 23, 1976

[54] HYDROPNEUMATIC SHOCK ABSORBER

[75] Inventors: Felix Wössner; German Schmitt, both of Schweinfurt am Main, Germany

[73] Assignee: Fichtel & Sachs A.G., Schweinfurt am Main, Germany

[22] Filed: Jan. 20, 1975

[21] Appl. No.: 542,163

[30] Foreign Application Priority Data
Feb. 1, 1974 Germany............................ 2404706

[52] U.S. Cl.............................. 267/64 R; 267/116; 293/85; 293/DIG. 2; 213/223; 188/269; 188/314
[51] Int. Cl.²............................................. F16F 9/06
[58] Field of Search............. 293/70, DIG. 2, 85–86; 267/64 R, 116, 139; 213/43, 223; 188/269, 314

[56] References Cited
UNITED STATES PATENTS

| | | |
|---|---|---|
| 3,019,029 | 1/1962 | Sampietro...................... 267/64 R X |
| 3,139,989 | 7/1964 | Thornhill............................ 213/223 |
| 3,656,632 | 4/1972 | Karakashian et al........... 213/223 X |
| 3,700,273 | 10/1972 | Jackson et al......................... 293/70 |
| 3,774,895 | 11/1973 | Willich et al.................. 267/64 R X |
| 3,804,216 | 4/1974 | Katsumori et al............. 267/64 R X |
| 3,833,248 | 9/1974 | Wossner et al. ........... 293/DIG. 2 X |
| 3,889,994 | 6/1975 | Edwards ............................... 293/85 |

Primary Examiner—Stanley H. Tollberg
Assistant Examiner—Charles A. Marmor
Attorney, Agent, or Firm—Hans Berman; Kurt Kelman

[57] ABSTRACT

A hydropneumatic shock absorber for use between a bumper and the chassis of a motor vehicle has a cylinder and a plunger guided in the cylinder by the radially enlarged inner end portion of the plunger and by an annular sealing assembly which axially bound a gap radially defined by respective walls of the cylinder and plunger. The sealing assembly includes a rigid guide ring axially secured on the plunger, a resilient sealing ring, and a backing ring of intermediate hardness axially interposed between the guide ring and the sealing ring. The hollow interior of the plunger is partly filled with a compressed gas and partly by liquid which also occupies the cylinder chamber outwardly closed by the plunger, a throttling passage in a closing disc which is an end wall of the plunger, and the remainder of the hollow plunger interior, the liquid being separated from the compressed gas by a floating partition in the plunger.

6 Claims, 3 Drawing Figures

HYDROPNEUMATIC SHOCK ABSORBER

This invention relates to hydropneumatic shock absorbers, and particularly to a shock absorber suitable for being mounted between the bumper and the chassis of an automotive vehicle.

More specifically, the invention is concerned with an improvement in a known shock absorber which includes an axially open cylinder and a hollow plunger axially movable inward and outward of the cylinder, an inner wall of the cylinder and an outer wall of the plunger being dimensioned to radially bound an annular gap therebetween. The hollow interior of the plunger is partly filled with a gas under a pressure much higher than atmospheric pressure, the remainder of the interior, the cylinder chamber, and a throttling passage in the plunger being filled by a liquid under the pressure of the gas.

A primary object of this invention is the provision of an improved guide and sealing arrangement movably connecting the walls of the plunger and cylinder in the afore-mentioned gap. In the known shock absorber, a guide ring is welded to the outer wall of the plunger. A plastic ring is slipped over a collar of the guide ring and backs a resilient sealing ring which is offset from the backing plastic ring toward the chamber between the cylinder bottom and the plunger. An additional guide ring is provided at the inner end of the plunger.

The known arrangement is relatively costly to build and results in numerous rejects due to warping of the plunger under the welding heat. Close tolerances must be maintained to avoid jamming of the sealing ring between the opposite axial walls of the cylinder and plunger which is exposed to the high pressure transmitted from the compressed gas by the liquid in the shock absorber.

In its more specific aspects, the invention aims at providing a shock absorber of the type described above which can be built at lower cost and requires less exacting tolerances than the known apparatus, and can be assembled in a single manner.

According to this invention, the inner end portion of the plunger is radially enlarged to approximately the internal diameter of the cylinder to provide guidance for the plunger, and the outer sealing arrangement which is radially interposed between the inner, axial cylinder wall and the outer, axial plunger wall and offset from the enlarged plunger portion in a direction axially outward of the cylinder includes, in axial sequence inward of the cylinder, a rigid guide ring, a backing ring, and a resilient sealing ring which simultaneously engages the axial walls of the cylinder and plunger so as to seal the gap between these walls.

Other features, additional objects, and many of the attendant advantages of this invention will readily be appreciated as the same becomes better understood by reference to the following detailed description of preferred embodiments when considered in connection with the appended drawing in which:

FIG. 1 shown a shock absorber of the invention in side-elevational section on its normally horizontal axis;

Figure 1:
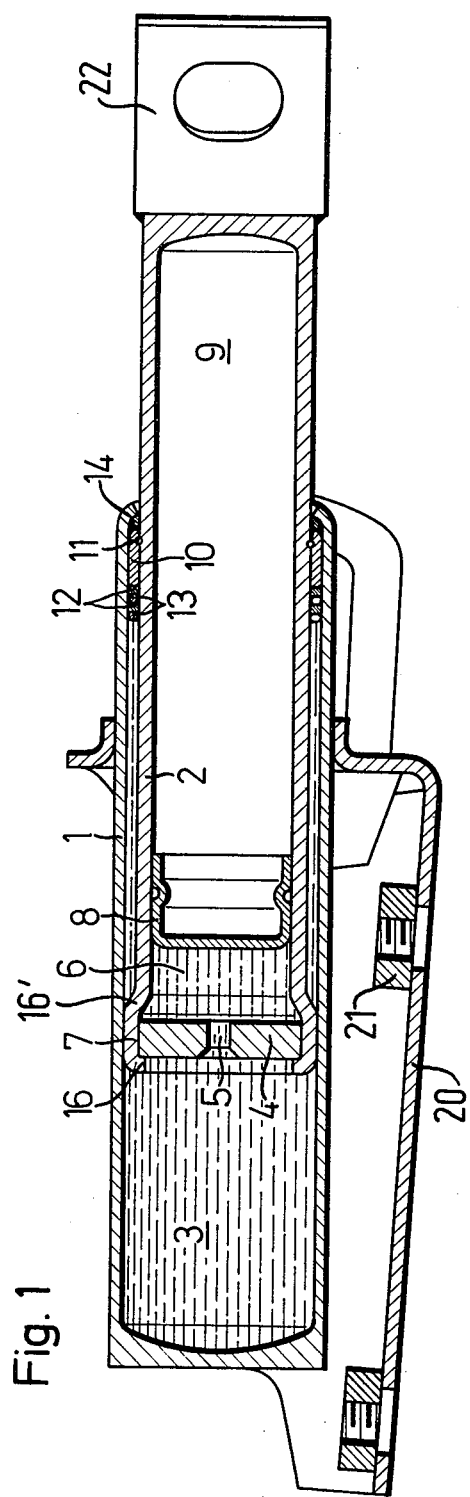

Referring now to the drawing in detail, and initially to FIG. 1, there is seen an elongated cylinder 1 which is a seamless cup and receives a similarly unitary, cup-shaped plunger 2. The bottom of the cylinder 1 and a closing disc 4 in the open end of the plunger 2 axially bound a chamber 3 which communicates though a throttling passage 5 in the disc 4 with a compartment 6 in the hollow interior of the plunger 2.

The axial wall of the plunger 2 is cylindrical and of uniform cross section in the main portion of the plunger, but the axially innermost portion 7 of the tubular plunger 2 is radially enlarged for guiding engagement with the inner wall of the cylinder 1 during axial movement of the plunger. The disc 4 is axially secured between a radial flange 16 formed by the beaded-over rim of the plunger 2 and the shoulder 16' which connects the end portion 7 to the uniformly cylindrical main portion of the plunger.

The compartment 6 is separated by a floating piston or partition 8 from the compartment 9 of the plunger interior which is bounded by the imperforated axial wall and the inperforate, integral, outer end wall of the plunger. As is conventional in itself, the compartment 9 is filled with air or nitrogen under a pressure much above atmospheric pressure, whereas the compartment 6, the throttling passage 5, and the chamber 3 are filled with a practically non-compressible liquid.

The shock absorber is normally attached to the chassis of a motor vehicle by a bracket 20 fixedly fastened to the cylinder 1 and carrying nuts 21. An eye 22 on the outer end of the plunger 2 is normally fastened to the non-illustrated bumper, at least two shock absorbers of the illustrated type being arranged between the bumper and chassis.

Figure 2:
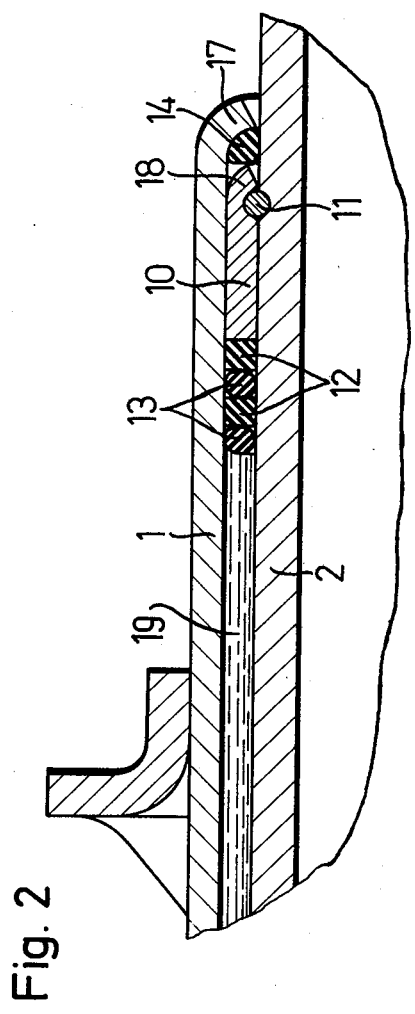
FIG. 2 shows a portion of the apparatus of FIG. 1 on a larger scale.

The plunger 2 is normally held in the illustrated position by the pressure of the gas in the compartment 9, further outward movement of the plunger 2 from the cylinder 1 being prevented by the guiding and sealing arrangement better seen in FIG. 2 which axially seals the annular gap 19 between the outer axial wall of the main portion of the plunger 2 and the inner wall of the cylinder 1. A guide ring 10 of originally stepped cylindrical shape has a thickness smaller than the radial width of the gap 19 by an amount too small to permit pictorial representation on the scale of FIG. 2 but sufficient to permit free axial movement of the ring 10 relative to the cylinder 1. The ring 10 consists of steel and is preferably zinc-plated or otherwise protected against rusting which could interfere with its axial mobility.

An open locking ring 11 of round wire is partly received in an annular groove of the outer plunger wall, and its radially projecting part is conformingly enveloped by a beaded-over axial end portion 18 of the ring 10 which is radially thinner than the remainder of the ring 10. The ring is not exposed to significant axially inward stresses in normal operation and is fully secured against axially outward displacement by abutting engagement with the wire ring 11.

A backing ring 12 of relatively hard plastic and of square cross section abuts against the inner, radial end face of the ring 10 and is followed in axial sequence inward of the cylinder 1 by a resilient o-ring 13, another square-sectioned backing ring 12 of plastic softer than the steel of the guide ring 10, but harder than the sealing ring 13, and a second sealing ring 13 which is axially exposed toward the gap 19 and the liquid filling the gap.

The rim of the cylinder 1 about the open cylinder end is beaded over to form a radial flange 17 directed toward the outer plunger wall and axially retaining another sealing ring 14. The ring 14, backed by the flange 17, provides a stop for limiting outward plunger movement and protects the guiding and sealing arrangement against corrosion by atmospheric moisture and against particulate contaminants.

Figure 3:
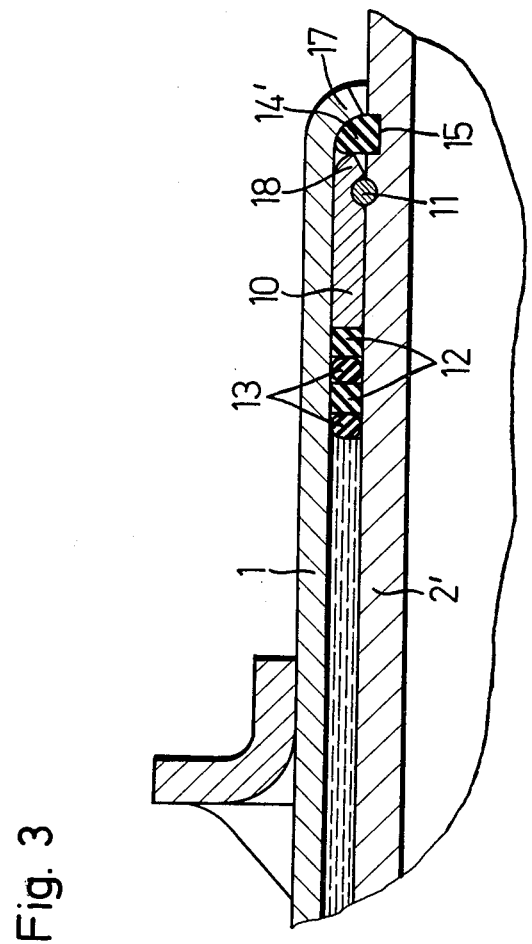
FIG. 3 illustrates a modification of the device of FIG. 2.

In the modified shock absorber of the invention partly shown in FIG. 3, the otherwise unchanged plunger 2' is provided with an annular groove 15 of rectangular cross section which receives a conforming sealing ring 14', thereby securing the ring 14' to the plunger 2' for joint axial movement relative to the cylinder 1, the apparatus of FIG. 3 being identical with that described with reference to FIGS. 1 and 2, as far as not otherwise specifically described and illustrated.

The shock absorber of the invention reacts to impact of the non-illustrated bumper against an obstacle by movement of the plunger 2 inward of the cylinder 1, whereby liquid is forced through the throttling passage 5, and gas in the compartment 9 is further compressed. The gas tends to restore the original condition against the resistance to liquid flow presented by the passage 5 and such outer conditions as may prevail.

Jamming, distortion, and injury of the sealing rings 13 during relative movement of the plunger 2 and cylinder 1 is safely avoided by the provision of the backing rings 12 because of the rectangular cross section of the latter, because of their radial width which is smaller than that of the gap 19 only by a clearance sufficient for smooth axial movement, and because of the consistency of the backing rings 12 which are somewhat resilient and intermediate in hardness between the elastomeric material of the o-rings 13 and the metal of the guide ring 10. A precise dimensional fit of the metallic elements and of the plastic rings 12 is not necessary, and the resilient rings 13 adapt themselves to the width of the gap 19 under the pressure transmitted from the gas in the compartment 9.

The backing rings 12 prevent the o-rings 13 from being squeezed between the guide ring 10 and the inner wall of the cylinder 1. A relatively wide clearance between the ring 10 and the cylinder 1 is thus permissible, and freezing of the rarely moving guide ring 10 to the cylinder 1 need not be considered. The provision of two sets of o-rings 13 and backing rings 12 improves durability and reliability of the shock absorber, but nothing significant is gained by more than two sets of rings.

Leakage of gas from the compartment 9 is practically impossible so that no provisions need be made for replenishing the gas cushion. Because of the absence of the refilling nipple, common in conventional shock absorbers of the pneumatic or hydropneumatic type, the cost of the shock absorber of the invention is reduced and a source of leaks is avoided. The imperforate walls of the compartment 9 do not interfere with the assembly of the shock absorber.

The rings 13, 12, 10 and the open wire ring 11 are slipped in this order over the main portion of the cup with enlarged rim portion which will ultimately form the plunger 2 until the wire ring 11 drops into the previously machined, matching groove in the outer plunger wall. The blank for the ring 10 is initially of stepped cylindrical shape, having an axial end portion 18 of reduced thickness which is slipped over the wire ring 11 and crimped into conforming engagement with the wire ring.

The sub-assembly so produced is set up in a fluid-tight chamber with the open plunger end up, and the chamber is filled with compressed air or nitrogen. The partition 8 is inserted by means of a simple manipulator and is followed by the disc 4 which is seated on the shoulder 16'. The disc is secured by beading the rim about the open end of the plunger 2 to form the flange 16.

The cylinder 1, provided with the bracket 20 and associated welded nuts 21, is set up vertically with its open end up and partly filled with damping liquid. The rim 17 of the cylinder is still cylindrical at this stage, and the plunger assembly, removed from the pressure chamber, is slipped coaxially into the cylinder 1. Enough liquid is provided initially in the cylinder to cause some liquid to overflow as the plunger assembly enters the cylinder cavity until the innermost sealing ring 13 seals the gap 19, and further inward movement of the plunger assembly drives liquid through the passage 5 into the hollow interior of the plunger. Ultimately, the sealing ring 14 or 14' is placed over the plunger 2 and the rim 17 is beaded over to retain the plunger in the illustrated position.

It should be understood, of course, that the foregoing disclosure relates only to preferred embodiments of the invention, and that it is intended to cover all changes and modifications in the examples of the invention herein chosen for the purpose of the disclosure which do not constitute departures from the spirit and scope of the invention set forth in the appended claims.

What is claimed is:
1. A shock absorber comprising:
  a. a cylinder having an axis and having an axial end portion open in one axial direction;
  b. a hollow plunger axially movable inward and outward of said cylinder and including a unitary tubular member and a disc axially closing the hollow interior of said tubular member,
    1. an inner wall of said cylinder and an outer wall of said tubular member radially bounding an annular gap,
    2. said cylinder and said plunger axially bounding a chamber in said cylinder,
    3. a portion of said tubular member axially adjacent said chamber being radially enlarged to bound said gap in an axially inward direction and guidingly engaging said inner wall during axial movement of said plunger,
    4. said tubular member being formed with a shoulder and a radial flange in said hollow interior,
    5. said enlarged portion axially connecting said shoulder and said flange,
    6. said disc being axially secured between said flange and said shoulder and being formed with a throttling passage connecting said hollow interior with said chamber;
  c. annular sealing means radially interposed between said walls, said sealing means being offset from said enlarged portion in said one axial direction and bounding said gap in said one axial direction, said sealing means including, in axial sequence inward of said cylinder, a rigid guide ring, a backing ring, and a resilient sealing ring simultaneously engaging said walls;
  d. a body of liquid filling said chamber, said gap, and a portion of said hollow interior;
  e. a body of gas under a pressure higher than atmospheric pressure retained in said hollow interior and biasing said liquid outward of said interior through said throttling passage;

f. abutment means on said outer wall abutting against said guide ring in an axial direction and securing said sealing means against axially outward displacement relative to said plunger,
  1. said sealing means being exposed to the body of liquid filling said gap,
  2. said abutment means including a ring member, said outer wall being formed with a groove receiving a part of said ring member, another part of said ring member projecting radially outward from said groove and being conformingly engaged by said guide ring;
g. a radial flange projecting from said open end portion of said cylinder toward said outer wall; and
h. a resilient annular sealing member radially interposed between said walls, and axially interposed between said flange and said guide ring.

2. A shock absorber as set forth in claim 1, wherein said backing ring essentially consists of a material intermediate in hardness between the material of said sealing ring and the material of said guide ring.

3. A shock absorber as set forth in claim 2, wherein said backing ring is of rectangular cross section and has a radial width substantially equal to the radial width of said gap.

4. A shock absorber as set forth in claim 3, wherein said sealing means further include another backing ring axially juxtaposed to said sealing ring, and another resilient sealing ring axially juxtaposed to said other backing ring in simultaneous engagement with said walls.

5. A shock absorber as set forth in claim 1, wherein said plunger has an imperforate wall bounding a compartment of said hollow interior in all radial directions and in said one axial direction, the shock absorber further including a partition member axially movable in said hollow interior in sealing engagement with said imperforate wall, said partition member bounding said compartment in the other axial direction, said body of gas being confined in said compartment and separated from said body of liquid by said partition member.

6. A shock absorber as set forth in claim 1, wherein said outer wall is formed with an annular groove receiving a part of said sealing member and thereby securing said sealing member to said plunger for movement therewith.

* * * * *